US008660717B2

(12) United States Patent
Calise

(10) Patent No.: US 8,660,717 B2
(45) Date of Patent: Feb. 25, 2014

(54) METHOD OF CORRECTING GUIDANCE COMMANDS FOR FLUID MEDIUM

(75) Inventor: Anthony J. Calise, Collegeville, PA (US)

(73) Assignee: Atair Aerospace, Brooklyn, NY (US)

( * ) Notice: Subject to any disclaimer, the term of this patent is extended or adjusted under 35 U.S.C. 154(b) by 13 days.

(21) Appl. No.: 12/721,049

(22) Filed: Mar. 10, 2010

(65) Prior Publication Data

US 2011/0029163 A1    Feb. 3, 2011

Related U.S. Application Data

(60) Provisional application No. 61/158,904, filed on Mar. 10, 2009.

(51) Int. Cl.
  *G06F 7/70* (2006.01)
(52) U.S. Cl.
  USPC .......................................................... 701/14

(58) Field of Classification Search
  USPC .......................... 701/3, 14, 200, 217, 220, 7
  See application file for complete search history.

(56) References Cited

U.S. PATENT DOCUMENTS 8,019,542 B2 * 9/2011 Hawkinson et al. .......... 701/220
2007/0088466 A1 * 4/2007 Preston ............................ 701/3

* cited by examiner

*Primary Examiner* — James Trammell
*Assistant Examiner* — Michael D Lang
(74) *Attorney, Agent, or Firm* — Ostrolenk Faber LLP

(57) ABSTRACT

A method of approximately correcting a vehicle's guidance system command for the disturbing effects of the medium through which it is moving, without having to sense or estimate the speed and direction of that medium. The correction is determined by taking the ratio of two scalar quantities: the speed of the vehicle relative to the medium, which can be estimated from the known fluid dynamic characteristics of the vehicle, divided by an approximation of inertial speed, which can be obtained using one or more on-board sensors such as a GPS, thus increasing transient performance of the vehicle moving through the fluid medium.

9 Claims, 11 Drawing Sheets

METHOD OF CORRECTING GUIDANCE COMMANDS FOR FLUID MEDIUM

CROSS-REFERENCE TO RELATED APPLICATIONS

This application claims priority to U.S. Provisional Patent Application No. 61/158,904 filed on Mar. 10, 2009 entitled "A Method of Correcting Guidance Commands For Fluid Medium", which is incorporated fully herein by reference.

BACKGROUND OF THE INVENTION

The primary field of application for this invention is guidance of unmanned aerial and underwater vehicles. In such applications it is common practice to compute a guidance command that results in a rate of turn that depends on a measurement of heading error. Both the measurement and the command are with respect to an inertial coordinate frame of reference. The guidance command is received and acted upon by a system (commonly referred to as an autopilot or stability augmentation system), which in turn sends commands to the vehicles servos and/or reaction control devices. This results in a movement of the vehicle's control surfaces, or vectors the thrust produced by the vehicle's propulsion system, or turns on-and-off a reaction control system, or a combination of such means of vehicle control. However vehicles respond to servo command relative to the medium through which they move, and when that medium is also in motion, then the rate of turn that is achieved depends nonlinearly on the speed and direction of the medium through which the vehicle is moving. This dependence can result in degraded or even unstable responses to the guidance system command, particularly for vehicles whose speed relative to the medium is not far greater than the speed of the medium itself (e.g. guided parafoils and underwater vehicles).

One approach to this problem is to sense the vector motion of the vehicle relative to the medium through which it is moving as well as its inertial velocity vector. By differencing these two quantities, one can compute the inertial velocity of the medium and provide a correction to the guidance command for that motion. However this requires incorporating devices that sense the vehicle's vector relative motion, which are not normally a part of the existing guidance and control system design. Such sensors in an aircraft are often referred to as an air data system.

SUMMARY OF THE INVENTION

This invention describes a method of approximately correcting the vehicle's guidance system command for the disturbing effects of the medium through which it is moving, without having to sense or estimate the speed and direction of that medium. This is accomplished by taking the ratio of two scalar quantities: the speed of the vehicle relative to the medium, which can be estimated from the known fluid dynamic characteristics of the vehicle, divided by an estimate of inertial speed, which can be obtained using on-board sensors.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention.

DESCRIPTION OF THE DRAWINGS

These and other features and advantages of the present invention will be better understood by reading the following detailed description, taken together with the drawings wherein.

DESCRIPTION OF THE INVENTION

The description provided here will be with reference to guided parafoils, but it is understood that the invention applies equally well to guidance of all air and underwater vehicles, or to any object that moves through and must be guided within a fluid medium. Moreover, while the invention is more likely to be employed in self-guided vehicles, it can equally be applied to vehicles that are flown by human operators, in order to improve their handling qualities under high wind speed or high current conditions.

Guidance systems for self-guided parafoils typically command an inertial turn rate ($\dot{\psi}_i$) that depends on the inertial heading error. The inertial heading error is typically computed from GPS measurements and knowledge of the target site coordinates. The guidance command is converted into a servo command that causes the vehicle to turn. A critical aspect in guidance system design is the steady state change in inertial turn rate achieved per unit change in servo movement, which in the context of this discussion we will call the 'parafoil gain'. The parafoil gain is obtained by calibrating the parafoil canopy response in a stepping response test in which the servo command is incrementally increased and the steady inertial heading rate is calculated from GPS velocity measurements taken over time in a calm air environment. The guidance gains that are chosen (typically proportional and integral gains) depend on this estimate for the parafoil gain. Design of the guidance loop gains is critical to shaping the transient performance of the guidance system in its ability to reduce the guidance error to near zero. If the parafoil gain is lower than anticipated then the response to guidance commands will be sluggish. If the parafoil gain is higher than anticipated, the response will be oscillatory or can even become unstable, resulting in an uncontrolled spin.

When flying in a wind field, the turn rate that is achieved by the air unit (in response to servo movement) is that of the velocity vector relative to the air mass (the air speed vector). Whereas, the guidance system is commanding a turn rate associated with the inertial velocity vector. The relationship between the horizontal components of the inertial velocity vector ($\vec{V}_i$), the airspeed vector ($\vec{V}_h$) and the wind vector ($\vec{V}_w$) can be understood from the geometry depicted in FIG. 1. It is assumed that the horizontal airspeed ($V_h$), the wind magnitude ($V_w$), and its direction ($\psi_w$) are constant, at least over the time scale that it takes for the parafoil to respond to a change in the guidance command. The guidance system commands $\dot\psi_i$, but for a given servo command, the canopy achieves a steady state turn rate in terms of $\dot\psi$. Therefore if the parafoil gain is measured in calm air, and we want to correct that value for the effect of a steady wind, then the guidance command should be divided by the ratio, $\dot\psi_i/\dot\psi$.

Figure 1:
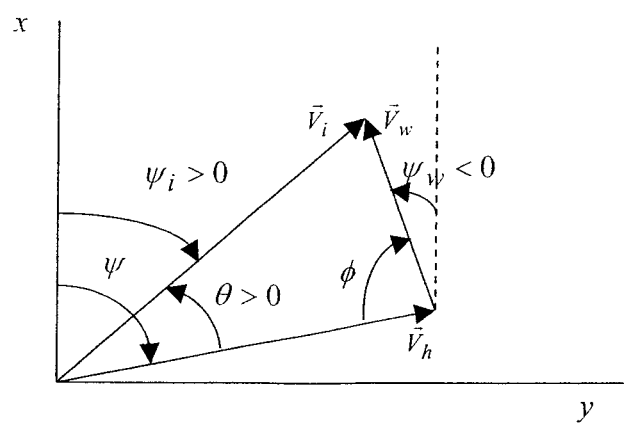
FIG. 1 details the geometry used to define the basic variables of the present invention.

In FIG. 1 it is shown that:

$$\frac{\dot\psi_i}{\dot\psi} = 1 - f(V_h, V_w, \delta\psi) \qquad (1)$$

where $\delta\psi=\psi-\psi_w$, and $$f(V_h, V_w, \delta\psi) = \frac{V_w \sin(\delta\psi)}{V_i \sin(\theta)}\left[1 - \frac{V_h}{V_i}\cos(\theta)\right] \qquad (2)$$

Note that $\delta\psi$ is the relative heading between the airspeed vector and the wind vector. If the air unit is always in symmetric flight (zero sideslip), then this is also the body heading angle relative to the wind vector. It is evident from the above that in order to use these formulas to correct the guidance command, it is necessary to know the wind magnitude and direction.

Figure 2:
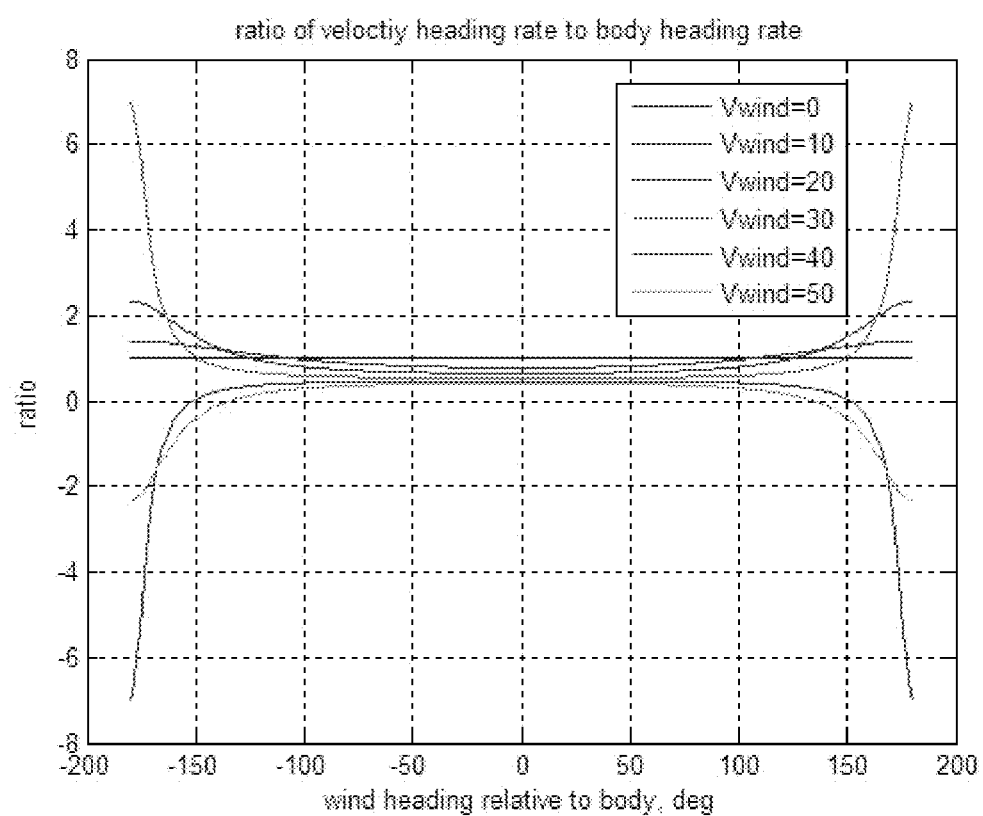
FIG. 2 details plots of the ratio of inertial velocity heading rate to body heading rate (for $V_h=35$ ft/s)

FIG. 2 displays a plot of (1−f) for several fixed values of $V_w$, with $V_h$=35 ft/s. Actually, it can be shown that the value of f only depends on the ratio, $V_w/V_h$. These plots all approach zero as $V_w$ approaches ∞, which means that at very high wind speeds there is no way to regulate inertial velocity heading by turning the parafoil (loss of controllability). Note that for $V_w > V_h$, we have a negative correlation when the relative heading is near 180°. This amounts to control reversal, or positive feedback in the guidance loop, which is certain to destabilize the canopy response. Also, the maximum magnitudes of the ratio occur at a relative heading of 180° and at wind speeds close to the canopy speed. The ratio is ∞ if $V_w=V_h$ and $\delta\psi=\pm\pi$. Therefore conditions close to these extremes are the worst from a guidance perspective because the response in terms of inertial heading rate can be out of phase by 180°, or even if it is in phase, the effective guidance loop gain can be very high. In general, both out-of-phase response and increasing loop gain tend to destabilize the guidance loop, and the guidance loop becomes unstable when attempting to fly directly into the wind if the wind speed approaches the horizontal airspeed.

In this section we examine an approximate formula for compensating the servo command for winds, thereby creating an approach for approximating the expression in Eq. (1), which does not require knowledge of wind speed and direction. As previously noted, the most critical condition arises when flying into the wind (see FIG. 2). Therefore the approximation entails evaluating f at $\delta\psi=\pm\pi$. At this condition we also have $\theta=0$ and $V_w=V_h-V_i$, so it is not possible to compute f directly using (2) because the function has an indeterminate form (0/0) at these values. However, the limit expression for f can be obtained by applying L'Hospital's rule[3,4], and can be shown to be $$f(V_h, V_i, \pm\pi) = \frac{V_i - V_h}{V_i} \qquad (3)$$

Consequently, $$\lim_{\delta\psi \to \pm\pi}\frac{\dot\psi_i}{\dot\psi} = 1 - f(V_h, V_w, \pm\pi) = \frac{V_h}{V_i} \qquad (4)$$

Note that the expression in (4) only requires an estimate for the airspeed speed ($V_h$) and the inertial horizontal speed ($V_i$). The latter is available from the GPS sensor, whereas the former can to be estimated based on past experience for specific canopies at a given weight and altitude. This will be discussed further in the next section.

Figure 3:
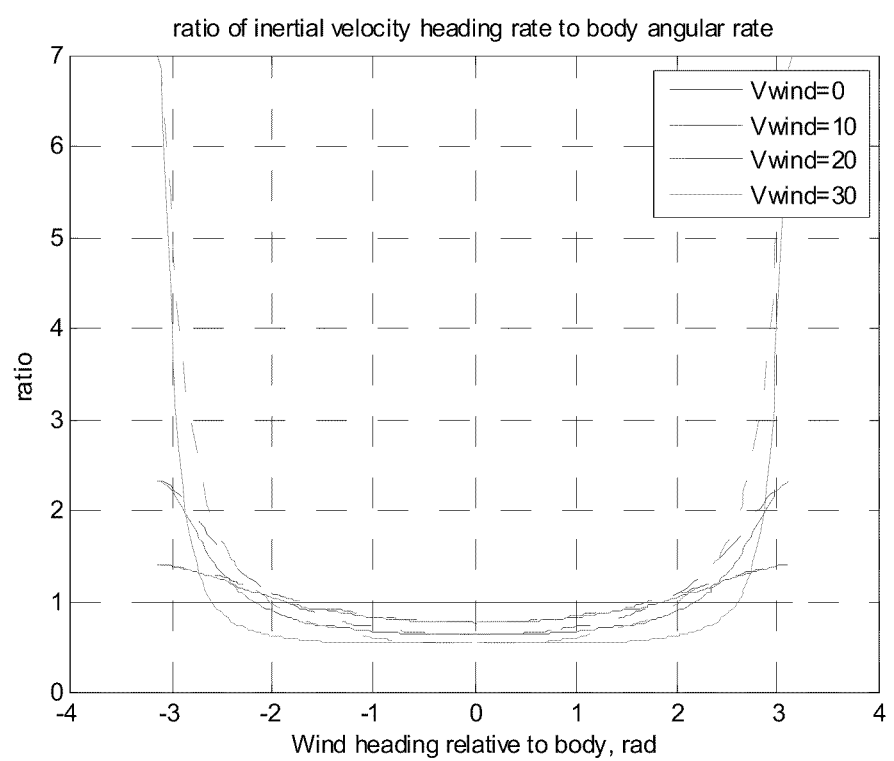
FIG. 3 details a comparison of the approximate expression in Eq. (4) (dashed lines) with the exact expression in Eq. (1) (solid lines)

FIG. 3 compares the approximation in Eq. (4) with the exact expression in Eq. (1), for $V_w$ between 0 and 30 ft/s, and $V_h$=35 ft/s. These are the same values used for the first 4 cases in FIG. 2. The dashed lines in this figure correspond to using the approximation. This shows that the approximation is exact for tail winds and head winds. Between these two extremes it overestimates the ratio in Eq. (1). Overestimating the ratio corresponds to reducing the guidance command more than is necessary, and therefore the error lies in a conservative direction (tends to make the airfoil more stable than needed, or more sluggish in responding to a guidance command). However for most of the range in $\delta\psi$ the approximation is quite good, and will result in a more aggressive response than we would have without dividing the guidance command by the ratio in Eq. (4), because ratio is less than 1 for a wide range of values of $\delta\psi$.

The ratio in Eq. (4) can only be used for wind speeds that do not exceed the canopy speed because otherwise $\psi_i$ is uncontrollable. From a practical perspective, we must place a lower limit on $V_i$.

In this section we consider 4 methods of increasing complexity for estimating the horizontal airspeed, $V_h$.

Method 1:

The first method is to use a constant average value that depends on the type of canopy being used.

Figure 4:
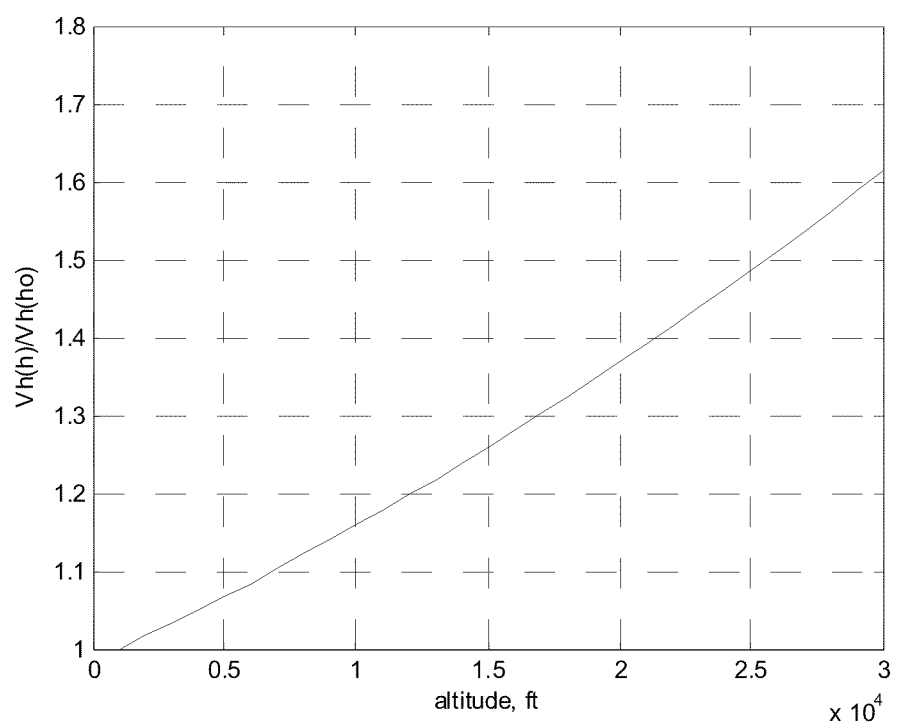
FIG. 4 details a Normalized canopy speed versus altitude.

Method 2:

The second method takes into account the dependence of $V_h^o$ on altitude ($h_o$). This approach entails defining a value ($V_h^o$) for a given fixed altitude ($h_o$) and computing $V_h(h)$ for the current altitude (h). It is shown in Ref. 2 that $V_h(h)$ can be closely approximated using $$V(h) = sqrt\left\{\frac{\rho(h_o)}{\rho(h)}\right\}V_h(h_o) \qquad (5)$$

where $\rho(h)$ is the air density as it depends on altitude. If we use an exponential air density model, then $$V(h) = e^{-(h-h_o)/2h_s} * V_h(h_o) \qquad (6)$$

where $h_s$ is the atmospheric scale height used to fit the exponential model to the density data for a standard atmosphere. A normalized plot of the approximation in Eq. (6) is given in FIG. 4 to give an indication of how much the ratio, $V(h)/V_h(h_o)$ can vary with altitude.

Method 3:

The third method takes into account the effect of altitude and total weight (W). One obvious way to do this is to use Eq. (6) with the canopy speed at $h=h_o$ defined for a range of total weights $$V_h(h,W) = e^{-(h-h_o)/2h_s} * V_h(h_o, W) \quad (7)$$

To introduce the weight dependence we can either calibrate the canopy speed at $h=h_o$ for at least two different weights and interpolate, or we can use an analytical approximation based on flight mechanics. For example, if we assume that both the glide ratio and the lift coefficient are weight independent, then Ref. 2 shows that the canopy speed varies with the square root of the weight. If we determine $V_n(h_o, W_o)$ for one nominal total weight, $W_o$, then $$V_h(h,W) = e^{-(h-h_o)/2h_s} * V_h(V_o, W_o) * \sqrt{W/W_o} \quad (8)$$

Figure 5:
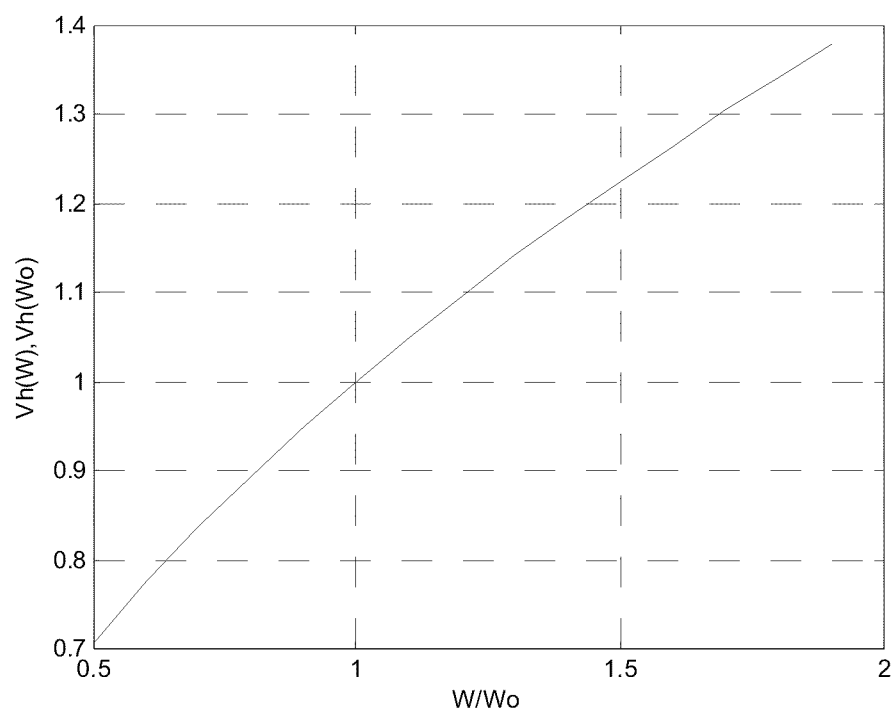
FIG. 5 details normalized canopy speed versus normalized weight.

The effect of this correction at $h=h_o$ is shown in FIG. 5.

Method 4:

The fourth method takes into account the effect of altitude, variable weight and turn rate. Ref. 2 shows that the equations of motion for quasi-steady turning flight (flight in which flight path angle and velocity are nearly constant) are governed by:

$$\dot{\psi} = g \tan \mu / V$$

$$\tan \gamma = \tan \gamma_g / \cos \mu$$

$$V = V_g \sqrt{\cos \gamma / \cos \gamma_g / \cos \mu} \quad (9)$$

where $\dot{\psi}$ is the heading rate of the airspeed vector, $\mu$ is the bank angle, V is the total airspeed, $\gamma$ is the flight path angle in turning flight, $\gamma_g$ is the flight path angle in gliding flight, and $V_g$ is the total glide airspeed. Note that $\tan \gamma_g = -1/GR$ where GR is the glide ratio, and $\cos \gamma_g = 1/\sqrt{1+\tan^2 \gamma_g}$. These quantities are regarded as constants, and are uniquely determined if we specify the value of GR. Also, $V_g = V_h(h, W, 0)/\cos \gamma_g$, where $V_h(h, W, 0)$ is the canopy speed at zero turn rate, which is estimated by any of the first three methods given above. Assuming that $\dot{\psi}$ is obtained from the gyro data, then we have three equations, which can be used to solve for the three unknowns: $\mu$, $\gamma$ and V. Simultaneous solution of these equations provides the value of V and $\gamma$, from which we can compute $$V_h(h, W, \dot{\psi}) = V \cos \gamma \quad (10)$$

These equations can be solved iteratively by choosing $V_g$ as an initial guess for V. Then solve the 1$^{st}$ equation for $\tan \mu$, solve the second equation for $\tan \gamma$ noting that $\cos \mu = 1/\sqrt{1+\tan^2 \gamma}$, and solve the 3$^{rd}$ equation for V, using the fact that $\cos \gamma = 1/\sqrt{1+\tan^2 \gamma}$, thereby avoiding trigonometric operations. Having obtained a new estimate for V, the process is repeated by going back to the first equation.

Figure 6:
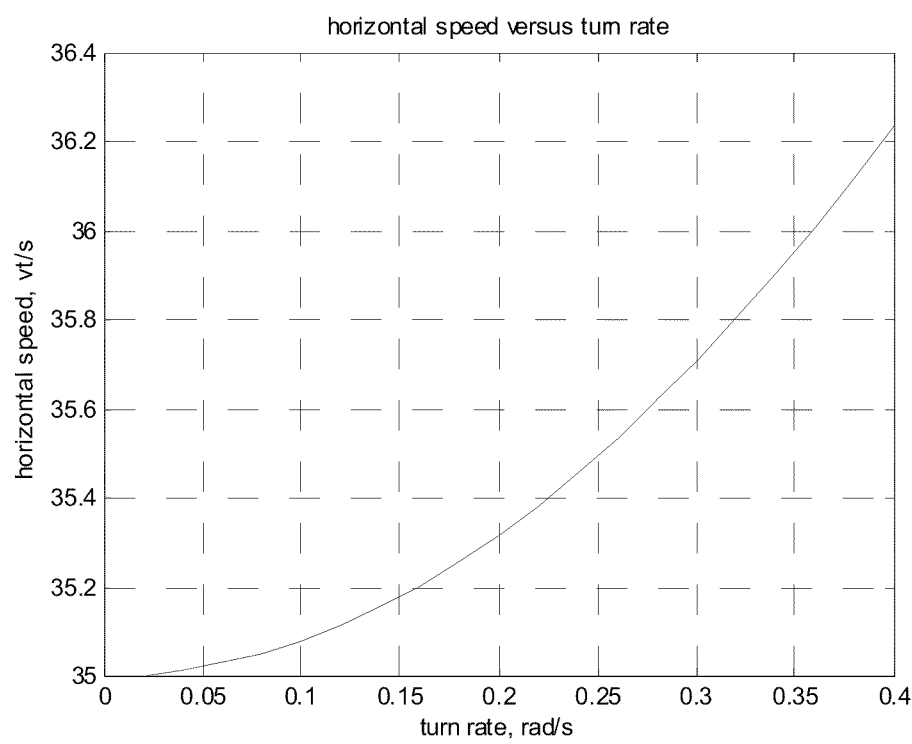
FIG. 6 details the effect of turn rate on canopy speed.
Figure 7:
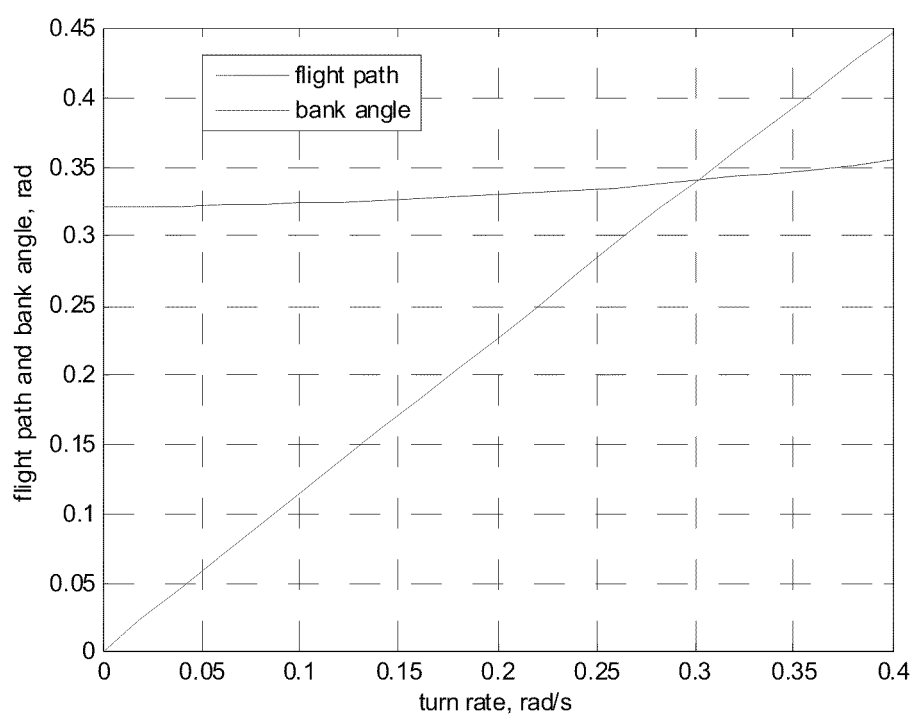
FIG. 7 details the effect of turn rate on flight path and bank angle.

FIG. 6 shows the result obtained using this method to compute the effect of turn rate on canopy speed, for a canopy speed in gliding flight of 35 ft/s. Note that the effect is very small up to a turn rate of 0.4 rad/s. So we can reliably ignore the effect of turn rate in estimating the airspeed. However, it should be noted that the algorithm converged in a single pass through the computation cycle to within 0.1 ft/s for each point in the graph. It should also be noted that a byproduct of this approach is that we also obtain estimates of the bank angle and flight path angle in turning flight, which may be useful for other purposes. This is depicted in FIG. 7.

Figure 8:
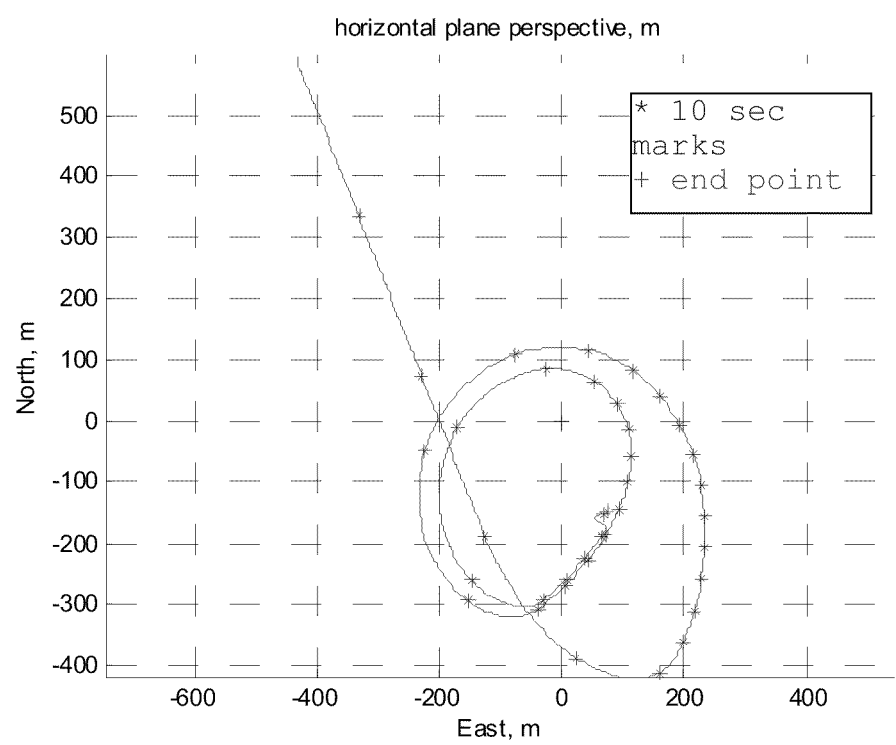
FIG. 8 details a trajectory without the approximate correction.
Figure 9:
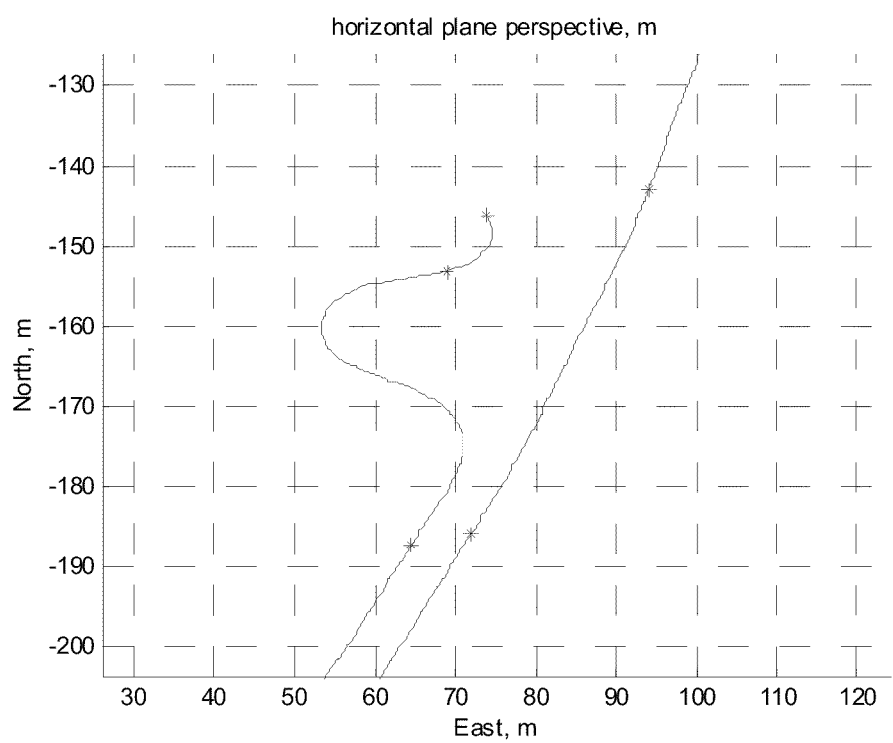
FIG. 9 details an expanded view in closeinstate.
Figure 10:
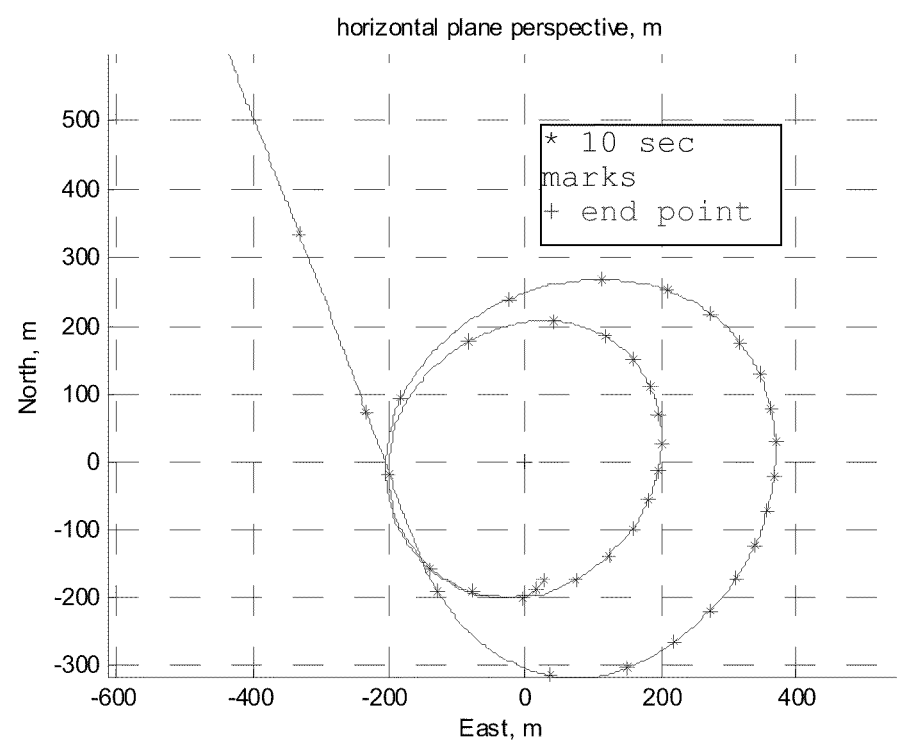
FIG. 10 details a trajectory with the approximate correction.
Figure 11:
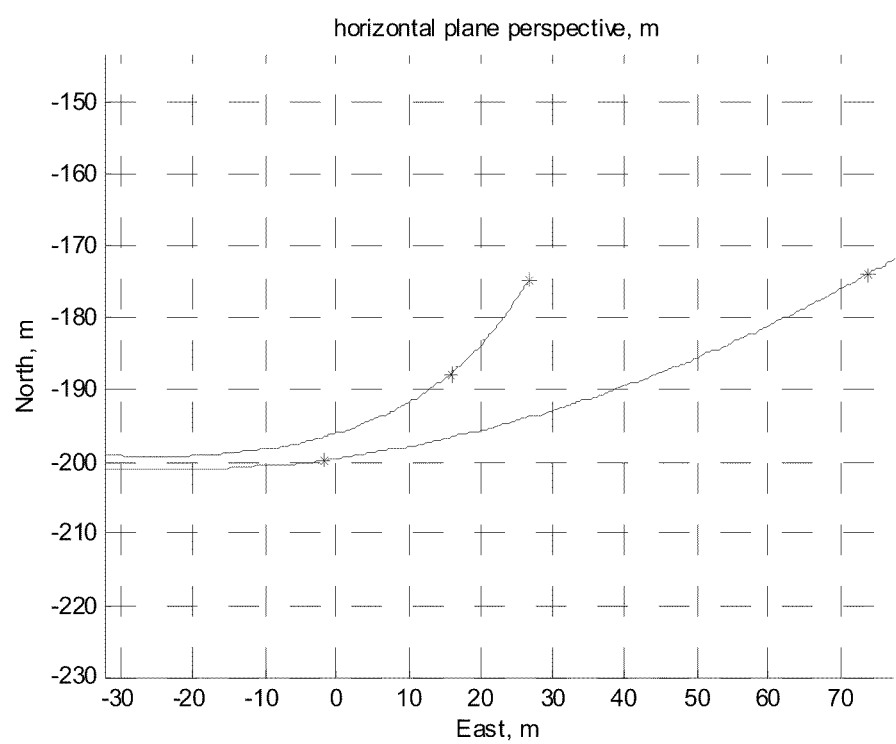
FIG. 11 details an expanded view in closeinstate.

The parameter settings are: $V_h(h_o) = 17$ m/s, $h_o = 2100$ m, $V_w = 12$ m/s to the South. The guidance strategy consists of turning towards the target site, entering into a descending spiral over the target site, and then turning towards the target site at a specified altitude above the target site. FIG. 8 shows a simulated response in the vicinity of the target site area without using the approximate correction factor in Eq. (4). Note the distortion in the spiral that occurs as a result of the high wind condition. FIG. 9 show that instability occurs after the turn towards the target site is initiated. FIG. 10 shows a simulated response for the same conditions with the approximate correction implemented in the guidance routine. For this test Method-1 was used to estimate $V_h$, and the correction factor was limited to a maximum value of 5.0. Note that a much more circular trajectory results, and FIG. 11 shows that the instability when turning towards the target site is eliminated.

Accordingly, the present invention discloses a novel and non-obvious, easy to implement method of correcting a vehicle's guidance system command for the disturbing effects of the medium through which it is moving, without having to sense or estimate the speed and direction of that medium.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention which is not to be limited except by the allowed claims and their legal equivalents.

The invention claimed is:

1. A method of correcting a vehicle's guidance system when said vehicle is moving in a fluid medium without having to sense or estimate the speed and direction of the fluid medium through which the vehicle is moving, the method comprising the acts of:

estimating a horizontal airspeed of a vehicle relative to a fluid medium by utilizing the known fluid dynamic characteristics of the vehicle;

obtaining an inertial horizontal speed of said vehicle utilizing a sensor on-board said vehicle;

responsive to said acts of estimating said airspeed of a vehicle relative to a fluid medium and obtaining said inertial horizontal speed of said vehicle using a sensor on-board said vehicle, determining a correction command value for the vehicle's guidance system by dividing the estimated vehicle airspeed by the obtained inertial horizontal speed; and providing said correction value as a command to said vehicle guidance system to increase transient performance of the vehicle moving through the fluid medium.

2. The method of claim 1, wherein the on-board sensor includes a GPS sensor.

3. The method of claim 1, wherein the vehicle is an autonomous self-guided vehicle.

4. The method of claim 1, wherein the vehicle is a manually guided vehicle.

5. The method of claim 1, wherein the vehicle is a parafoil.

6. The method of claim 1, wherein the vehicle is an autonomous self-guided parafoil.

7. The method of claim 1, wherein the act of determining a correction command value for the vehicle's guidance system utilizes the formula $$\lim_{\delta \psi \Rightarrow \pm \pi} \frac{\dot{\psi}_i}{\dot{\psi}} = 1 - f(V_h, V_w, \pm \pi) = \frac{V_h}{V_i}$$

wherein ($\Psi_i$) equals an inertial turn rate, ($V_h$) equals horizontal air speed, ($V_w$) equals fluid medium magnitude, ($\Psi_w$) equals the fluid medium direction; and ($V_i$) equals inertial horizontal speed of the vehicle.

8. The method of claim 1, wherein the act of estimating a horizontal airspeed of a vehicle relative to a fluid medium is selected from the group of acts consisting of:
- utilizing a constant average value depending on the type of vehicle;
- taking into account the current altitude (h) of the vehicle;
- taking into account the altitude and total weight of the vehicle; and
- taking into account the altitude, total weight and turn rate of the vehicle.

9. A method of correcting an autonomously guided parafoil's guidance system when said parafoil is moving in wind conditions without having to sense or estimate the speed and direction of the wind through which the parafoil is moving, the method comprising the acts of:
- estimating a horizontal airspeed of the parafoil relative to the wind through which the parafoil is moving by utilizing the known fluid dynamic characteristics of the parafoil;
- obtaining an inertial horizontal speed of said parafoil utilizing a sensor on-board said parafoil;
- responsive to said acts of estimating said airspeed of said parafoil relative to said wind and obtaining said inertial horizontal speed of said parafoil using a sensor on-board said vehicle, determining a correction command value for the parafoil's guidance system by dividing the estimated parafoil airspeed by the obtained inertial horizontal speed; and
- providing said correction value as a command to said parafoil guidance system to increase transient performance of the parafoil moving through said wind.

* * * * *